No. 872,849. PATENTED DEC. 3, 1907.
M. D. ROSA.
SAFETY DEVICE FOR VEHICLES.
APPLICATION FILED MAY 25, 1907.
2 SHEETS—SHEET 1.
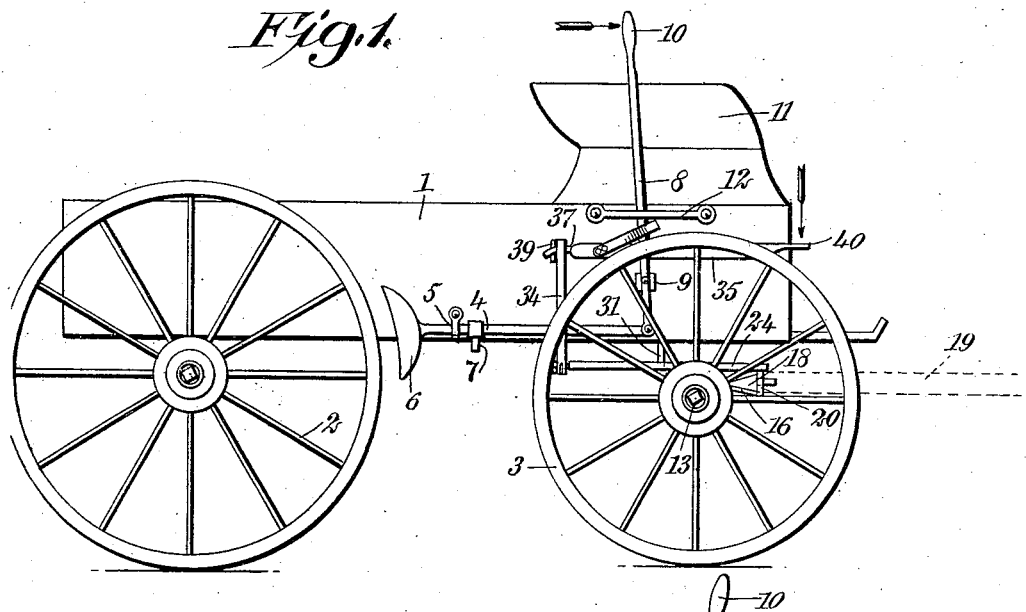
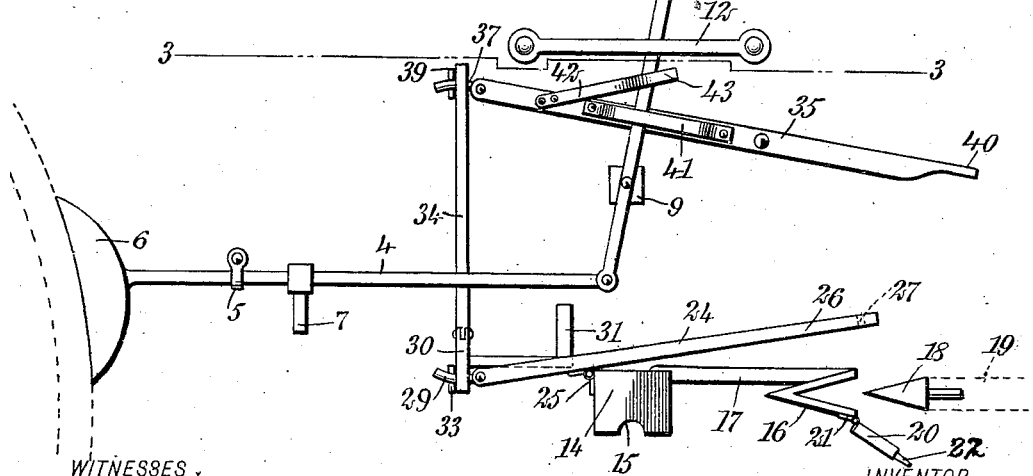
WITNESSES
INVENTOR
Marco Dalla Rosa
BY
ATTORNEYS No. 872,849. PATENTED DEC. 3, 1907.
M. D. ROSA.
SAFETY DEVICE FOR VEHICLES.
APPLICATION FILED MAY 25, 1907.
2 SHEETS—SHEET 2.
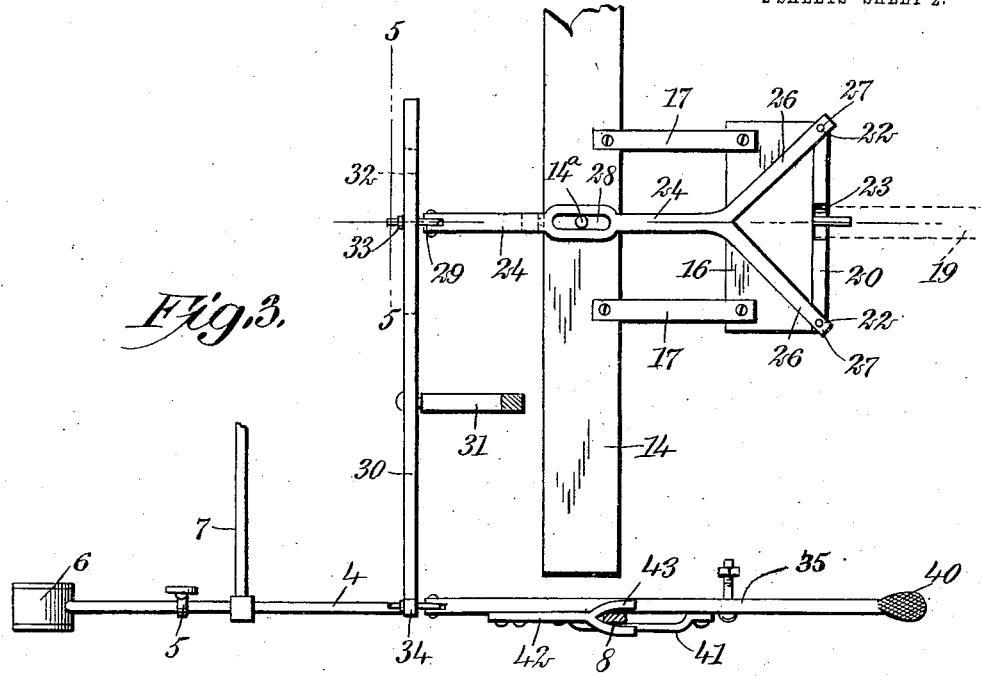
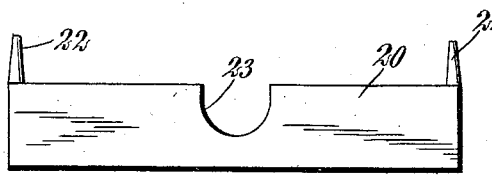
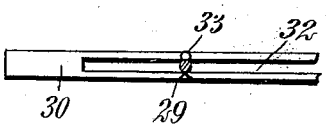
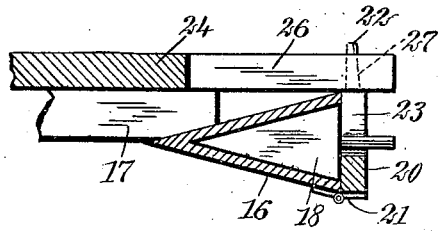
WITNESSES
INVENTOR
Marco Dalla Rosa
BY
ATTORNEYS

UNITED STATES PATENT OFFICE.

MARCO DALLA ROSA, OF NEW ROCHELLE, NEW YORK, ASSIGNOR OF ONE-HALF TO JOHN DE BONA, UMBERTO DE BONA, VITTORIO DE BONA, SANTO BARON, AND AGOSTINO LOSSO, ALL OF NEW ROCHELLE, NEW YORK.

SAFETY DEVICE FOR VEHICLES.

No. 872,849.  Specification of Letters Patent.  Patented Dec. 3, 1907.

Application filed May 25, 1907. Serial No. 375,626.

*To all whom it may concern:*

Be it known that I, MARCO DALLA ROSA, a subject of the King of Italy, and a resident of New Rochelle, in the county of Westchester and State of New York, have invented a new and Improved Safety Device for Vehicles, of which the following is a full, clear, and exact description.

This invention relates to safety devices for vehicles.

The object of the invention is to provide a simple, strong and efficient safety device for vehicles, by means of which the draft animals can be instantly released from the vehicle in case of necessity.

A further object of the invention is to provide a device of this character, by means of which in case of emergency the brakes can be set simultaneously with the release of the draft animals from the vehicle.

The invention consists in the construction and combination of parts to be more particularly described hereinafter and fully set forth in the claims.

Reference is to be had to the accompanying drawings forming a part of this specification, in which similar characters of reference indicate corresponding parts in all the views, and in which Figure 1 is a side elevation of a vehicle, showing my invention applied thereto; Fig. 2 is an enlarged side elevation of my invention; Fig. 3 is a plan view showing parts in horizontal cross-section on the line 3—3 of Fig. 2; Fig. 4 is a front elevation of a detail; Fig. 5 is an elevation of a detail showing a part in cross-section on the line 5—5 of Fig. 3; Fig. 6 is an enlarged vertical cross-section of a detail; and Fig. 7 is an enlarged vertical cross-section of a further detail.

Before proceeding to a more detailed explanation of my invention, it should be understood that accidents due to the running away of horses attached to vehicles are often a source of great danger to life and limb. In an accident of this kind, where it is practically impossible to control the frightened animals by means of the reins, or where the latter have become loosened or broken, the occupants of the vehicle are practically helpless and can make no effective efforts toward stopping the animals to avoid injury. To obviate this danger my invention provides means for instantly releasing the horses from a vehicle, while at the same time, the brakes of the vehicle are set to bring the same to a stop. While the brake coöperates with my safety device it can be used independently, as a brake, without interference with the safety device.

Referring more particularly to the drawings, 1 represents the body of the vehicle having rear wheels 2 and front wheels 3. The vehicle can of course, be of any preferred or common form. At the side of the vehicle is arranged a brake-rod 4 slidably carried in a guide socket 5. At the end, the brake-rod has a brake-shoe 6 of the usual kind and adapted to engage the rim of a rear wheel in the usual manner. A similar brake-rod is engaged at the opposite side of the vehicle and is connected rigidly with the first brake-rod by means of a cross-bar 7. The brake-rod 4 is pivotally joined at the forward end to a hand brake lever 8 pivotally mounted upon a suitable bracket 9 at the side of the vehicle. The upper end of the brake-lever has the usual handle 10 adjacent to the seat 11 for the driver of the vehicle. At the side, the vehicle further has a guide-bracket 12 to limit the movement of the brake-lever, the latter being slidably arranged between the bracket and the side of the vehicle. The front wheels 3 are mounted on the usual axle 13 carried at the under side of an axle-bar 14 in a suitable recess 15. The axle-bar is pivoted at the under side of the vehicle body by means of the usual king-bolt 14ª, so that the front wheels can be turned laterally to guide the vehicle.

Rigidly mounted upon the axle-bar 14 by means of arms 17 is a V-shaped socket member 16; the arms 17 are rigid with both the axle-bar and the socket so that when the socket is moved laterally in one direction or the other the axle is turned correspondingly. A wedge-shaped member 18 is removably arranged in the socket 16 and is rigidly secured to the draft attachment 19 by means of which the horses or other animals are secured to the vehicle. Hinged at the lower forward edge of the socket is a retaining member 20 mounted on the socket by means of suitable hinges 21. At the edge opposite to the hinges, the retaining member 20 has projecting pins 22; the pins are arranged at the opposite ends of the member and when the latter is in position at the opening of the V-shaped socket the pins project upwardly beyond the latter. Near the center, the retaining member is cut away to form a recess 23 to permit the extension therethrough of the means for securing the draft attachment to the wedge-shaped member 18. A lever 24 is pivoted at the upper side of the axle-bar 14 by means of a hinge 25. The forward end of the lever 24 is bifurcated and presents outwardly disposed forks 26 presenting openings 27 near the ends, serving to engage the pins 22 of the retaining member 20 to hold the same in position. The lever 24 has a slot 28 through which the king-bolt 14ª extends. When the lever 24 is swung upwardly about the hinge 25 the forks are disengaged from the retaining member and the latter is moved aside by the thrust of the wedge-shaped member 18 thereagainst, and thus the pull of the draft animals instantly releases them from the vehicle. The lever 24 has the end slotted; in the slotted end is arranged a pivoted curved finger 29. A second lever 30 is pivoted upon an arm 31 carried at the under side of the vehicle body and has an elongated slot 32 in which the finger 29 is slidably arranged. Thus the lever 24 can turn with the movement of the axle, while at the same time remaining in operative engagement with the lever 30. A cotter-pin 33 prevents the accidental displacement of the finger from the slot 32.

A vertical link 34, having at the lower end an extension located in a slot at the end of the lever 30, is pivotally joined to the lever 30 and has at its upper end a transverse opening 38. An operating lever 35 having a slot 36 at one end, is pivoted at the side of the vehicle body. A curved pivoted finger 37 is arranged in the slot 36 and extends through the transverse opening 38 in the link 34. A cotter-pin 39 serves to hold the finger 37 against accidental displacement. The free end of the operating lever 35 may be provided either with a handle for manual operation or with a pedal extension 40, so that it can be depressed by the foot of the operator. When the operating lever 35 is depressed, the link 34 is moved upwardly thereby swinging the lever 30 about its pivotal point to depress the adjacent end of the lever 24, thereby releasing the retaining member 20 and permitting the removal of the wedge-shaped member 18 from the socket 16. The operating lever 35 is arranged adjacent to the brake-lever 8 and transversely thereof. An offset strap 41 is mounted upon the operating lever 35 and holds the brake-lever 8 against lateral movement, though permitting the operating movement of the brake-lever without hindrance. The operating lever 35 further has a rigid arm 42 extending toward the brake-lever and presenting at the outer end a fork 43, adapted to engage with the brake-lever and to project the same forward when the operating-lever 35 is depressed; thus when the draft attachment is released from the vehicle the brake is simultaneously set by the forward movement of the brake-lever. When the operating lever 35 is in an operative position, the brake can be controlled by the usual movement of the brake lever which can operate independently of the safety mechanism.

Having thus described my invention I claim as new, and desire to secure by Letters Patent:—

1. In a device of the class described, a socket, a member removably arranged in said socket and adapted to be rigidly secured to a draft attachment, a retaining member hinged to said socket and adapted to hold said member within said socket, said retaining member having a projection extending beyond said socket when said retaining member is in an operative position, a pivoted lever having an opening adapted to engage said projection, a second lever having an elongated slot, said first lever slidably engaging said slot, an operating lever, and a link connecting said operating lever and said second lever.

2. In a device of the class described, a socket, a member removably arranged in said socket and adapted to be rigidly secured to a draft attachment, a retaining member hinged to said socket and adapted to hold said member within said socket, said retaining member having a projection extending beyond said socket when said retaining member is in an operative position, a pivoted lever adapted to engage said projection, said lever having a pivoted finger, a second pivoted lever having an elongated slot engaging said finger, an operating lever, and a link connecting said operating lever and said second lever.

3. In a device of the class described, a socket, a member removably arranged in said socket and adapted to be rigidly secured to a draft attachment, a retaining member hinged to said socket, a pivoted lever adapted to engage said retaining member to hold the same in an operative position, said lever having a pivoted finger, a second lever having an elongated slot engaging said finger, an operating lever having a pivoted finger, and a link operatively connected with said second lever, said link having an opening engaging said pivoted finger of said operating lever.

4. In a device of the class described, a socket, a member removably arranged in said socket, a retaining member hinged to said socket and adapted to hold said member within said socket, a lever engaging said retaining member to hold the same in an operative position, an operating lever controlling said first lever and adapted to be operated to release said retaining member, and a brake lever, said operating lever having an arm adapted operatively to engage said brake lever when said operating lever is operated.

5. In a device of the class described, a socket, a member removably arranged in said socket and adapted to be secured to a draft attachment, a retaining member hinged at said socket and having a projection, a pivoted lever removably engaging said projection to hold said retaining member in an operative position, a second pivoted lever operatively connected with said first lever, an operating lever for controlling said second lever, and a brake lever, said operating lever having an arm presenting a fork adapted operatively to engage said brake lever, when said operating lever is operated.

6. In a device of the class described, a socket, a member removably arranged in said socket and adapted to be rigidly secured to a draft attachment, a retaining member hinged to said socket and having a projection, a pivoted lever adapted removably to engage said projection, said lever having a pivoted finger, a second pivoted lever having an elongated slot, said finger being slidably carried in said slot, an operating lever, a link connecting said operating lever and said second lever, and a rigid extension on said operating lever and presenting a forked end adapted to engage a brake lever to operate the same when said operating lever is actuated.

In testimony whereof I have signed my name to this specification in the presence of two subscribing witnesses.

MARCO DALLA ROSA.

Witnesses:
    JOHN K. BRACHVOGEL,
    JOHN P. DAVIS.